Dec. 27, 1966   W. A. SCHLESINGER ET AL   3,293,930
VARIABLE DIAMETER V-BELT PULLEY
Filed Jan. 27, 1965
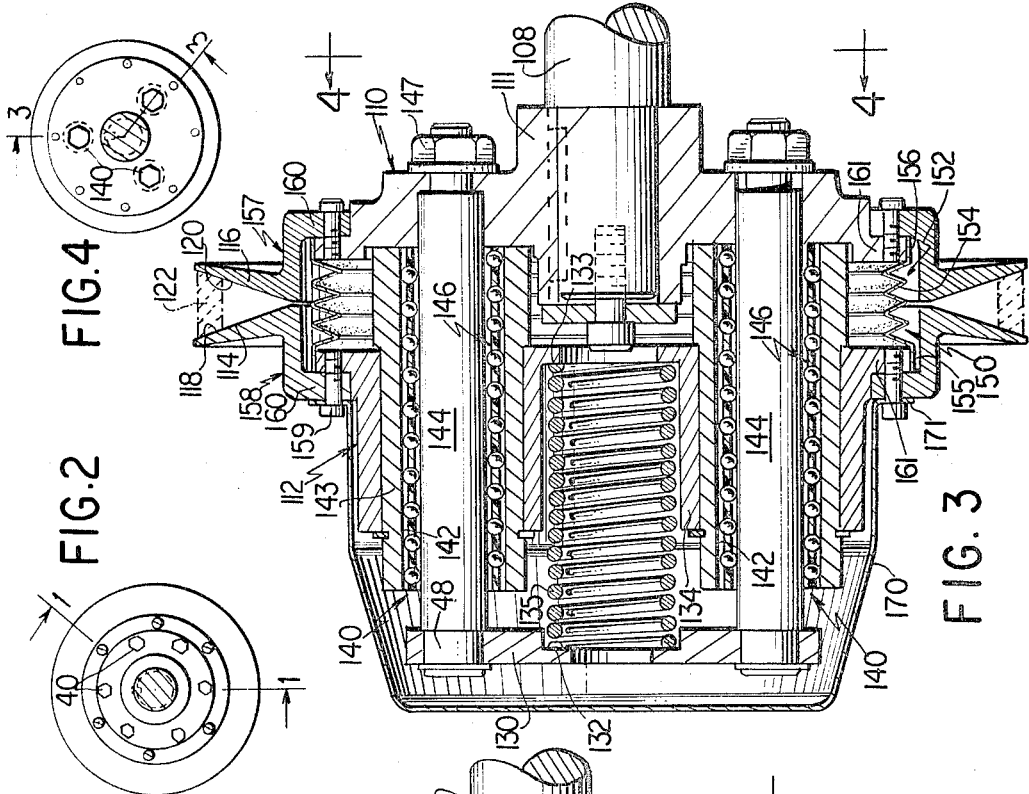
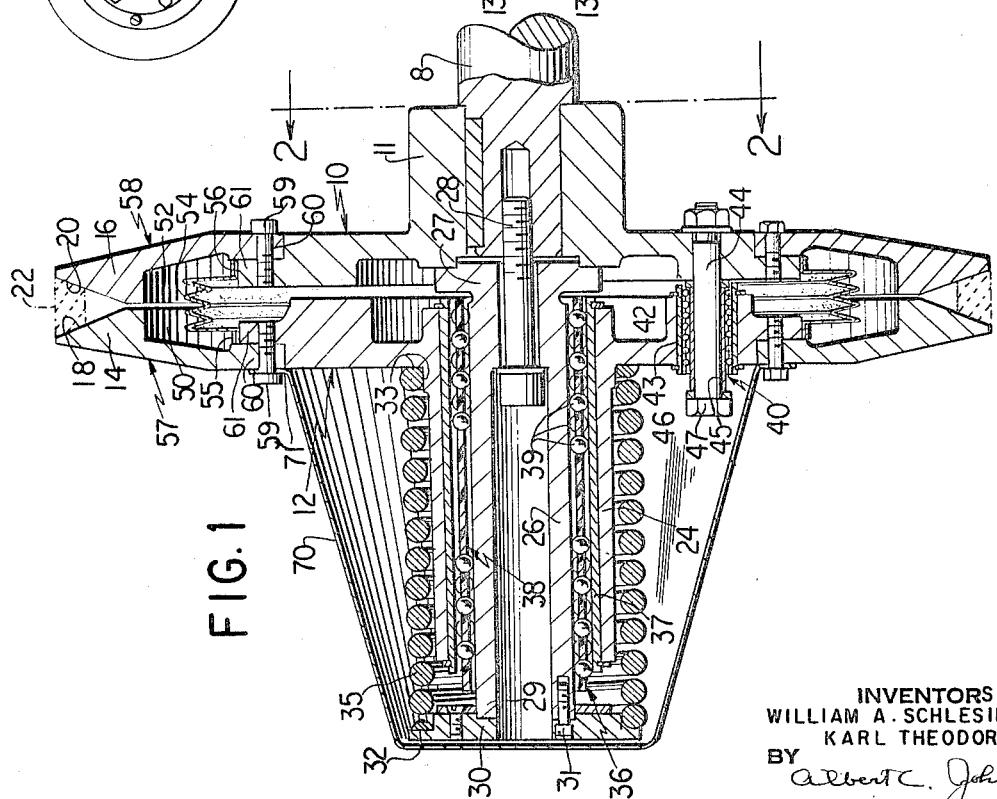
INVENTORS
WILLIAM A. SCHLESINGER
KARL THEODOR LANG
BY
Albert C. Johnston
ATTORNEY

# United States Patent Office 3,293,930
Patented Dec. 27, 1966

3,293,930
VARIABLE DIAMETER V-BELT PULLEY
William A. Schlesinger, Ridgewood, N.J., and Karl Theodor Lang, Darmstadt, Germany, assignors to William F. Huck, New York, N.Y.
Filed Jan. 27, 1965, Ser. No. 428,480
7 Claims. (Cl. 74—230.17)

This invention relates to a variable diameter V-belt pulley of the type that responds automatically to variations of the tension in a belt trained about the pulley.

Known V-belt pulleys of this type, such as those disclosed in United States Patent No. 2,812,666, have required very expensive milling and finishing operations in order to provide the required precision and sensitivity to counteracting belt and spring forces in the parts of the pulley which must move axially to vary its pitch diameter in response to variations of the V-belt tension.

Difficulties also occur in the use of such known pulleys as a result of accumulation of dust, lint or other foreign matter on and between their bearing surfaces and other moving parts.

It is an object of the present invention to provide an improved variable diameter V-belt pulley of the type mentioned which can be manufactured at reduced costs and yet will be assured of providing the required precision and sensitivity of operation in use.

Another object is to provide such a pulley that will respond accurately and instantly to variations of the V-belt tension over prolonged periods of service, even though installed in locations, such as in printing plants, where the ambient atmosphere is likely to contain dust, lint or other foreign matter detrimental to precision machinery.

Variable diameter V-belt pulleys of the type here concerned generally make use of coaxial pulley members having oppositely facing rims to engage opposite sides of a V-belt trained about them, together with means for constantly biasing these members toward one another against the tension of the belt, means for mounting one of the pulley members for rotation on a fixed axis, and anti-friction means interconnecting the two members for rotation together as a unit yet for relative axial movement when there are variations of the counteracting forces applied by the V-belt and the biasing means.

According to the present invention, the anti-friction means interconnecting the pulley members include bearing socket means formed in one of these members, each socket means presenting an inwardly facing tubular surface extending parallel to the axis of rotation of the pulley, together with bearing core means which are fixed to the other pulley member and extend concentrically through and beyond the socket means, each core means presenting an outwardly facing bearing surface parallel and symmetrical to said surface of the related socket means; and an anti-friction bearing sleeve is confined be-between the said opositely facing surfaces of each bearing core means and the related socket means. By virtue of the structures here provided, the pulley can be produced and assembled economically and will be assured of operating with the required precision and sensitivity in use.

According to another feature of the invention, at least one of the pulley members has its inner side formed with an annular recess concentric to the axis of rotation, at a location between the belt-engaging rims and the anti-friction means which interconnect the pulley members, and an imperforate flexible bellows concentric with the axis has its margins sealed to opposite inner portions of the pulley members at said location, so that the bellows will always bridge the space between the pulley members and prevent foreign matter from reaching the anti-friction means and other internal parts by seepage between the pulley rims.

Further objects, features and advantages of the invention and particulars of the construction of pulleys provided according to the invention will be apparent from the following description and the accompanying drawings of illustrative embodiments thereof. In the drawings:

FIG. 1 is a cross sectional view of a pulley according to one embodiment of the invention, taken along line 1—1 of FIG. 2;

FIG. 2 is an end elevation of the same pulley as viewed from line 2—2 of FIG. 1;

FIG. 3 is a cross sectional view of another embodiment of the invention, taken along line 3—3 of FIG. 4; and FIG. 4 is an end elevation of the pulley of FIG. 3 as viewed from line 4—4 of FIG. 3.

Referring first to the embodiment of FIGS. 1 and 2, the variable diameter pulley there shown includes two coacting disc-like pulley members generally indicated at 10 and 12, which are mounted for rotation together on a supporting shaft 8 keyed to the hub 11 of member 10. These pulley members have rim portions 14 and 16 which present oppositely facing inclined surfaces 18 and 20 to bear against the opposite sides of a V-belt 22 trained about them.

The pulley member 12 is formed with a hollow cylindrical shell 24 projecting from its outer side in coaxial relation to the shaft 8 and hub 11 of member 10. An externally cylindrical stem 26 having an inner end or head 27 secured in fixed relation to pulley member 10, as by a bolt 28 passed through the head 27 and screwed into the end of shaft 8, extends concentrically through the shell 24 to an outer end 29 of the stem, where an annular flange 30 is fixed to the stem, as by screws 31, beyond and in spaced relation to the outer end of the shell 24.

The rim of flange 30 forms an annular seat 32 facing toward pulley member 12 and aligned with a similar seat 33 formed on an annular portion of member 12 at the outer side of shell 24. A cylindrically coiled compression spring 35 surrounding the shell 24 has its outer and inner ends supported on the seats 32 and 33. The spring constantly exerts a strong force against the seats along the axis of the pulley, thus constantly biasing member 12 toward member 10 against the tension of the V-belt 22, which itself exerts upon the inclined rim surfaces 18 and 20 an axially directed force tending constantly to move the two pulley members away from one another.

It will be understood that the pitch diameter of the pulley and, thus, the ratio of its rotational speed to the linear speed of the V-belt are to vary in response to variations of the force exerted in axial direction upon the pulley members 10 and 12 by the belt 22. If that force exceeds the force of the spring 35, the pulley members are to move apart until the two forces are balanced, thus reducing the pitch diameter and increasing the speed ratio; while if that force becomes less than the force of the spring, the spring is to move the pulley members toward one another, thus producing the opposite effects.

In order to ensure the required accuracy and precision of the axial movements and positions of the pulley members in relation to the counterbalancing forces applied axially to them, it is important that these forces be kept centered at and in precise alignment with the axis of the pulley and that there be a minimum of frictional resistance to changes of axial position in response to variations of the belt tension. At the same time, it is of course necessary that the pulley members be interconnected so that they will always rotate as a unit in the same angular relationship to their axis, yet will always be free to undergo relative axial movement upon a variation of the belt tension.

According to the embodiment of FIG. 1, these required functions are obtained in a structure which can make use of a relatively heavy compression spring 35 and work efficiently under relatively heavy loads applied through the belt 22. To these ends, the pulley members 10 and 12 are interconnected for rotation together yet for relative movement strictly in the axial direction, by means of a plurality of anti-friction devices of the nature shown at 40 in FIG. 1, which are spaced apart symmetrically about the axis of rotation as indicated in FIG. 2; and the required constant axial alignment of the applied forces is further ensured by the provision of a similar but larger anti-friction device 36 which is concentric with these member and disposed inside the heavy spring 35.

Each of the anti-friction devices at 40, as seen in FIG. 1, includes a cylindrical bearing socket 42 extending through the axially movable pulley member 12 with the axis of the socket parallel to the axis of rotation, together with a cylindrical bearing core 44 which is fixed to the other pulley member and extends through and beyond the socket 42 in concentric relation thereto and a cylindrical anti-friction bearing unit 46 which is confined between the confronting surfaces of the core and socket. The core thus is free to slide axially relative to the bearing unit and the socket so that the pulley members will respond sensitively to the forces applied to them in axial direction, and yet it couples the pulley members together so that they will always rotate together without any play in the circumferential direction.

The cylindrical surface of each socket 42 may be formed by a cylindrical bearing lining 43 suitably fitted and secured in a bore formed through the body of pulley member 12. The cylindrical surface of each core 44 may be formed by a cylindrical bearing sleeve 45 fitted and secured on the body of a bolt 47 suitably secured to pulley member 10. Each bearing unit 46 advantageously is a ball bearing sleeve unit of well known form, consisting of a cylindrical carrier having a very large number of ball bearings rollably mounted in it so as to protrude evenly from its inner and outer sides in even rolling engagement with the confronting cylindrical surfaces of the related socket 42 and core 44.

The central anti-friction device 36 is constituted in part by the cylindrical shell 24 on pulley member 12 and the stem 26 extending through this shell from pulley member 10. The shell is provided with a bearing lining 37 fitted in it to give it a truly cylindrical inner surface. The stem is made with a truly cylindrical external surface uniformly spaced from the inner surface of shell 24, and a cylindrical anti-friction bearing unit 38 shorter than the stem is confined between the confronting surfaces of the stem and the shell. This unit advantageously is also a ball bearing sleeve unit of well known form, consisting of a cylindrical carrier having a very large number of ball bearings 39 rollably mounted in it so as to protrude evenly from its inner and outer sides in even rolling engagement with the confronting cylindrical surfaces of the stem and shell.

According to a further feature of the invention, the inner sides of the pulley members 10 and 12 have mating annular recesses 52 and 50, respectively, formed in them in concentric relation to the axis of rotation, at a location between the belt engaging rims 14 and 16 and the several anti-friction devices 40; and an imperforate annular flexible bellows 54 bridges the space between the pulley members at this location and has its margins 55 and 56 sealed in the recesses, so as to exclude from the anti-friction devices and from other internal parts of the pulley the foreign matter, such as dust, line or other air-borne particles, that otherwise would reach these parts by seeping through the space between the pulley rims.

The folded, accordion-like structure of the bellows keeps the internal parts of the pulley sealed off from the space between the rims yet imposes minimum resistance to the axial movements of the pulley members toward and away from one another. The recessed structure of the pulley members provides space to accommodate the bellows when the pulley members are located in their closest proximity.

For ease of manufacture and assembly of the pulley members, their rims 14 and 16 are made as the outer parts of removable rim sections 57 and 58 which have the recesses 50 and 52 largely formed therein and are secured to body sections of the pulley members by screws 59 passing through mating flanges 60 and 61 on the respective sections. The opposite margins or edge portions 55 and 56 of the bellows are sealed to the cylindrical ends of the two flanges 61 before the rim sections are secured in place.

The structures of the pulley protruding from the outer side of member 12, including spring 35 and its seats and the central anti-friction device 36, are enclosed within an imperforate frusto-conical cover member or housing 70 which has its marginal edge or base 71 secured tightly to member 12, as by confinement beneath the heads of screws 59. This housing excludes air-borne foreign matter from access to said protruding structures.

While the anti-friction devices 36 and 40 have been described as being of cylindrical form, it will be evident that similar devices making use of a socket, core and ball bearing sleeve of uniformly square or other polygonal cross section may be used to assure the required substantially friction-free axial mobility of pulley member 12.

Referring now to FIGS. 3 and 4, the embodiment there shown provides a variable diameter pulley according to the invention which is particularly useful in applications requiring relatively low horsepower and torque or where space limitations restrict the allowable pulley diameter.

As in the previously described embodiment, there are two coacting pulley members 110 and 112, with member 110 keyed to a supporting input or output shaft 108 clamped into its hub 111 and with a concentric compression spring 135 biasing the two members toward one another and against the sides of a V-belt 122 trained about rims 114 and 116 of the pulley members. The tension of the V-belt produces a pressure against the inclined rim surfaces 118 and 120, and this results in a force in axial direction counterbalancing the force of spring 135.

In this second embodiment the pulley members are interconnected for rotation together yet for relative movement in axial direction by means of three anti-friction devices 140 which are spaced apart symmetrically about the axis of rotation as indicated in FIG. 4. Each of these devices is considerably larger and closer to the axis than the similar device 40 of FIG. 1; so no anti-friction device need be provided at the center of the system inside the compression spring.

Each device 140 is constituted by an enlongated cylindrical bearing socket 142 fixed in member 112, a cylindrical bearing core 144 which is fixed to member 110 and extends concentrically through and beyond the socket 142, and a cylindrical anti-friction bearing unit 146 which is confined between the confronting surfaces of the core and sleeve. Each socket 142 is formed by a tubular member 143 secured in a passage through the body of member 112. Each core 144 is fitted into a recess 145 formed in the body of member 110, where it is bolted securely as indicated at 147. Each bearing unit 146 advantageously has the form of a ball bearing sleeve of the kind described in reference to elements 38 and 46 of FIG. 1.

As further seen in FIG. 3, the outer end 148 of each bearing core 144 extends through and is fastened to a thrust bracket 130 which is spaced from the adjacent ends of the tubular members 143. This bracket interconnects the ends of the several bearing cores, thus spanning the space between them, and it is formed centrally with an annular seat 132 sustaining the thrust of the outer end of spring 135. The inner end of this spring is seated in a socket 133 formed by a cup-like member 134 which is mounted between the several tubular members 143 in concentric relation to the axis of rotation.

It will be evident that in the embodiment of FIGS. 3 and 4 the bearing cores 144 serve the three functions of (1) coupling the pulley member together for rotation as a unit, (2) enabling movement of member 112 axially toward or away from member 110, and (3) transmitting to member 110 the pressure exerted by spring 135 against the thrust bracket 130, by which the pulley members are constantly biased toward one another in axial direction.

The pulley members as shown in FIG. 3 are again made with removable rim sections 157 and 158 which have flanges 160 fitting flanges 161 on the related body sections and are secured in place by screws 159 or other suitable fasteners in these flanges.

The rim sections form annular recesses 150 and 152 at the inner sides of the pulley members to accommodate an imperforate flexible bellows 154 at a location between the belt-engaging rims 114 and 116 and the anti-friction devices and other internal parts of the pulley. The opposite side edges or margins 155 and 156 of the bellows are sealed to the ends of the flanges 161 so that the imperforate body of the bellows will always bridge the space between the pulley members and exclude foreign matter from access to their internal parts.

An imperforate cover member or housing 170 encloses the working parts of the structures protruding from the outer side of pulley member 112 and has its marginal edge or base 171 secured tightly to that member, so as to exclude foreign matter from access to those working parts.

It will be obvious to those skilled in the art that various changes and modifications can be made in the embodiments hereinabove described without departing from the true spirit and scope of the invention which is intended to be defined by the appended claims.

What is claimed is:

1. A variable diameter V-belt pulley comprising
adjacent coaxial pulley members having oppositely facing rims adapted to engage opposite sides of a V-belt trained about them,
means for constantly biasing said members toward one another against the tension of said belt,
means for mounting a first of said members for rotation on a fixed axis, and
anti-friction means interconnecting said members for rotation together in constantly fixed angular relation and yet for free relative movement parallel to said axis,
said anti-friction means including bearing socket means in one of said members, each said socket means presenting an inwardly facing tubular surface extending parallel to the axis of rotation of said members, bearing core means fixed to the other of said members and extending through and beyond said socket means, each said core means presenting an outwardly facing bearing surface parallel and symmetrical to said surface of the related socket means, and an anti-friction bearing sleeve confined between said oppositely facing surfaces of each said core means and the related socket means, whereby said members are freely movable toward and away from one another under forces applied to them by said belt and said biasing means.

2. A variable diameter pulley according to claim 1, said biasing means comprising oppositely facing annular seats fixed respectively to and concentric with said pulley members and a compression spring bearing at its opposite ends against said seats.

3. A variable diameter V-belt pulley comprising
adjacent coaxial pulley members having oppositely facing rims adapted to engage opposite sides of a V-belt trained about them,
means for constantly biasing said members toward one another against the tension of said belt,
means for mounting a first of said members for rotation on a fixed axis, and
anti-friction means interconnecting said members for rotation together in constantly fixed angular relation and yet for free relative movement parallel to said axis,
said anti-friction means including a plurality of bearing sockets in one of said members, said sprockets being spaced apart symmetrically about said axis and each of them presenting an inwardly facing tubular surface extending parallel to said axis, a plurality of bearing cores fixed to the other of said members, said cores respectively extending through and beyond said sockets and each said core presenting an outwardly facing bearing surface parallel and symmetrical to said tubular surface of the related socket, and an anti-friction bearing sleeve confined between said oppositely facing surfaces of each said core and the related socket, whereby said pulley members are freely movable toward and away from one another under forces applied to them by said belt and said biasing means.

4. A variable diameter pulley according to claim 3, further comprising a tubular shell extending from one side of said one member and having an internal surface concentric with and symmetrical to said axis, a stem extending from said other member through and beyond said shell and having an external surface parallel and symmetrical to said internal surface, and an anti-friction bearing sleeve confined between said internal and external surfaces, the end of said stem having an annular flange thereon, said biasing means including a compression spring surrounding said shell and bearing at one end against the flange and at its other end against an annular portion of said one member outside said shell.

5. A variable diameter pulley according to claim 3, further comprising a thrust bracket interconnecting the ends of said bearing cores and having an annular seat disposed centrally thereof, and a spring socket disposed centrally on said one member and opening toward said seat, said biasing means including a compression spring having one end seated in said spring socket and its other end bearing against said seat.

6. A variable diameter V-belt pulley comprising
adjacent coaxial pulley members having oppositely facing rims adapted to engage opposite sides of a V-belt trained about them,
means for constantly biasing said members toward one another against the tension of said belt,
means for mounting one of said members for rotation on a fixed axis,
anti-friction means interconnecting said members for rotation together in constantly fixed angular relation and yet for free relative movement parallel to said axis,
and an imperforate flexible bellows concentric with said axis and having marginal portions thereof sealed to opposite inner portions of said pulley members at a location between said rims and said anti-friction means to prevent foreign matter from reaching said anti-friction means by seepage between said rims,
at least one of said pulley members being annularly recessed at its inner side to accommodate said bellows when said members are in their closest proximity.

7. A variable diameter V-belt pulley comprising
adjacent coaxial pulley members having oppositely facing rims adapted to engage opposite sides of a V-belt trained about them,
means for constantly biasing said members toward one another against the tension of said belt,
means for mounting a first of said members for rotation on a fixed axis,
anti-friction means interconnecting said members for rotation together in constantly fixed angular relation and yet for free relative movement parallel to said axis, said anti-friction means including a plurality of bearing sockets in one of said members, said sockets being spaced apart symmetrically and having their axes parallel to the axis of rotation of said members, a plurality of bearing cores fixed to the other of said members and respectively extending through and beyond said sockets in concentric relation thereto, and an anti-friction bearing sleeve confined between each said core and the related bearing socket, whereby said members are freely movable toward and away from one another under forces applied to them by said belt and said biasing means, mating annular recesses concentric with said axis being formed in the inner sides of said pulley members at a location between said rims and said anti-friction means, and an imperforate annular flexible bellows bridging the space between said members with its margins sealed in said recesses, to exclude from said anti-friction means foreign matter seeping between said rims.

References Cited by the Examiner

UNITED STATES PATENTS

| | | | |
|---|---|---|---|
| 2,198,747 | 4/1940 | Stobb | 74—230.17 |
| 2,640,365 | 6/1953 | Michie | 74—230.17 |
| 2,812,666 | 11/1957 | Huck | 74—230.17 |
| 3,048,056 | 8/1962 | Wolfram | 74—230.17 X |

DAVID J. WILLIAMOWSKY, *Primary Examiner.*

L. H. GERIN, *Assistant Examiner.*